(12) United States Patent
Nozue et al.

(10) Patent No.: US 10,393,337 B2
(45) Date of Patent: Aug. 27, 2019

(54) VEHICULAR HEADLAMP

(71) Applicant: Koito Manufacturing Co., Ltd., Tokyo (JP)

(72) Inventors: Shuhei Nozue, Shizuoka (JP); Akira Hanada, Shizuoka (JP); Takaya Shimizu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/830,194

(22) Filed: Dec. 4, 2017

(65) Prior Publication Data
US 2018/0163940 A1 Jun. 14, 2018

(30) Foreign Application Priority Data
Dec. 12, 2016 (JP) ................ 2016-240555

(51) Int. Cl.
*F21V 5/00* (2018.01)
*F21S 41/25* (2018.01)
(Continued)

(52) U.S. Cl.
CPC ........... *F21S 41/25* (2018.01); *B60Q 1/0041* (2013.01); *B60Q 1/04* (2013.01); *B60Q 1/18* (2013.01); *F21S 41/141* (2018.01); *F21S 41/147* (2018.01); *F21S 41/151* (2018.01); *F21S 41/19* (2018.01); *F21S 41/192* (2018.01); *F21S 41/36* (2018.01); *F21S 41/40* (2018.01); *F21S 45/42* (2018.01); *F21S 45/47* (2018.01); *F21S 41/255* (2018.01); *F21S 41/295* (2018.01); *F21W 2102/13* (2018.01); *F21W 2102/19* (2018.01); *F21Y 2115/10* (2016.08)

(58) Field of Classification Search
CPC ...... F21S 41/25; F21S 41/295; B60Q 1/0041; B60Q 1/02; B60Q 1/04; B60Q 1/0408
USPC .......................... 235/520, 538, 543
See application file for complete search history.

(56) References Cited

U.S. PATENT DOCUMENTS

| | | | |
|---|---|---|---|
| 2015/0338047 A1* | 11/2015 | Honda | F21V 13/04 362/517 |
| 2016/0097505 A1* | 4/2016 | Kinouchi | F21S 41/147 362/509 |
| 2016/0334072 A1* | 11/2016 | Meyrenaud | F21S 41/24 |

FOREIGN PATENT DOCUMENTS

| | | |
|---|---|---|
| JP | 2010-218964 A | 9/2010 |
| JP | 5512183 B2 | 6/2014 |

(Continued)

OTHER PUBLICATIONS

An Office Action dated Jan. 10, 2019, issued from the Korean Intellectual Property Office (KIPO) of Korean Patent Application No. 10-2017-0170234 and an English translation thereof.

*Primary Examiner* — Daniel St Cyr
(74) *Attorney, Agent, or Firm* — Abelman, Frayne & Schwab (57) ABSTRACT

Provided is a vehicular headlamp including: a first light source that emits a first light serving as a low beam; a second light source that emits a second light serving as a high beam; a projection lens that transmits the first light and the second light; a third light source that emits a third light in response to at least one of an operation of a steering and an operation of a direction indicator; and an optical member that adjusts a light distribution of the third light. The first light source, the second light source, and the third light source share a single heat sink.

16 Claims, 7 Drawing Sheets

(51) Int. Cl.
*F21S 45/47* (2018.01)
*B60Q 1/18* (2006.01)
*F21S 41/141* (2018.01)
*F21S 41/36* (2018.01)
*F21S 41/40* (2018.01)
*F21S 45/42* (2018.01)
*B60Q 1/04* (2006.01)
*B60Q 1/00* (2006.01)
*F21S 41/19* (2018.01)
*F21S 41/147* (2018.01)
*F21S 41/151* (2018.01)
*F21Y 115/10* (2016.01)
*F21S 41/29* (2018.01)
*F21S 41/255* (2018.01)
*F21W 102/13* (2018.01)
*F21W 102/19* (2018.01)

(56) References Cited

FOREIGN PATENT DOCUMENTS

| | | |
|---|---|---|
| JP | 2016-170910 A | 9/2016 |
| KR | 10-2010-0005681 A | 1/2010 |

\* cited by examiner

VEHICULAR HEADLAMP

CROSS-REFERENCE TO RELATED APPLICATIONS

This application is based on and claims priority from Japanese Patent Application No. 2016-240555 filed on Dec. 12, 2016 with the Japan Patent Office, the disclosure of which is incorporated herein in its entirety by reference.

TECHNICAL FIELD

The present disclosure relates to a vehicular headlamp.

BACKGROUND

There has been known a vehicular headlamp, which is represented by a headlight for automobiles, including a low-beam light source that illuminates the front at night, as well as a high-beam light source that illuminates farther than the low beam. The light from the high-beam light source includes a light irradiated upward from the low beam. In addition, a vehicular headlamp has been known in which such light sources are provided in a single lamp unit.

For example, Japanese Patent No. 5512183 discloses an illumination device for automobiles in which a first light source serving as a low-beam light source, a second light source serving as a high-beam light source, and a projection lens that transmits lights emitted from the first and second light sources are provided in a single lamp unit.

SUMMARY

Further, in recent years, a third light source may be provided in addition to the low-beam and high-beam light sources, in order to enhance the function of the vehicular headlamp. The third light source may be exemplified by a light source for irradiating a light in the traveling direction in accordance with turning of the vehicle.

However, since the light sources generate heat during the light emission, a cooling unit is required to release the heat generated by the light sources. This cooling unit tends to enlarge because a heat sink and optionally a cooling fan are included therein. In the related art, when the third light source is provided in the vehicular headlamp as described above, the vehicular headlamp requires a separate cooling unit for the third light source in addition to the cooling unit for the first and second light sources.

Therefore, the present disclosure is to provide a vehicular headlamp which includes a third light source in addition to low-beam and high-beam light sources and is suppressed from being enlarged.

In order to solve the above-described problem, according to an aspect of the present disclosure, there is provided a vehicular headlamp including: a first light source that emits a first light serving as a low beam; a second light source that emits a second light serving as a high beam; a projection lens that transmits the first light and the second light; a third light source that emits a third light in response to at least one of an operation of a steering and an operation of a direction indicator; and an optical member that adjusts a light distribution of the third light. The first light source, the second light source, and the third light source share a single heat sink.

In the above-described vehicular headlamp, the first light source, the second light source, and the third light source share a single heat sink. Therefore, it is not necessary to provide a heat sink or a cooling fan for the third light source separately from the heat sink or the cooling fan for the first and second light sources. As a result, the vehicular headlamp may be suppressed from being enlarged while providing a third light source in addition to the low-beam and high-beam light sources.

Further, in the above-described vehicular headlamp, the third light may be emitted transversely from the third light source.

Further, in the above-described vehicular headlamp, the optical member may be a lens formed integrally with the projection lens.

When the optical member for adjusting the light distribution of the third light and the projection lens are formed integrally in this manner, the vehicular headlamp may be further suppressed from being enlarged.

Further, when the optical member and the projection lens are formed integrally as described above, a through-hole or a notch may be formed between the optical member and the projection lens.

When a through-hole or a notch is formed in this manner, it is possible to suppress the third light from being propagated from the optical member to the projection lens and causing an unintended light to be emitted from the projection lens.

Further, the optical member may be a lens whose width in a direction perpendicular to a direction in which the third light is incident increases as being close to a front side from a rear side.

When the optical member for adjusting the light distribution of the third light is a lens having the shape as described above, it is easy to cause the third light to be emitted in the forwardly obliquely transverse direction of the vehicle.

Further, the optical member may be a convex lens.

When the optical member for adjusting the light distribution of the third light is a convex lens, it is easy to irradiate the light within a predetermined range by reducing the divergence angle of the third light.

As described above, according to the present disclosure, there is provided a vehicular headlamp which includes a third light source in addition to low-beam and high-beam light sources and is suppressed from being enlarged.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

Vehicular headlamps are generally provided in the front opposite parts of the vehicle in the left and right direction, respectively, and the left and right vehicular headlamps are configured to be generally symmetrical to each other in the left and right direction. Therefore, in the exemplary embodiment, one vehicular headlamp will be described.

Figure 1:
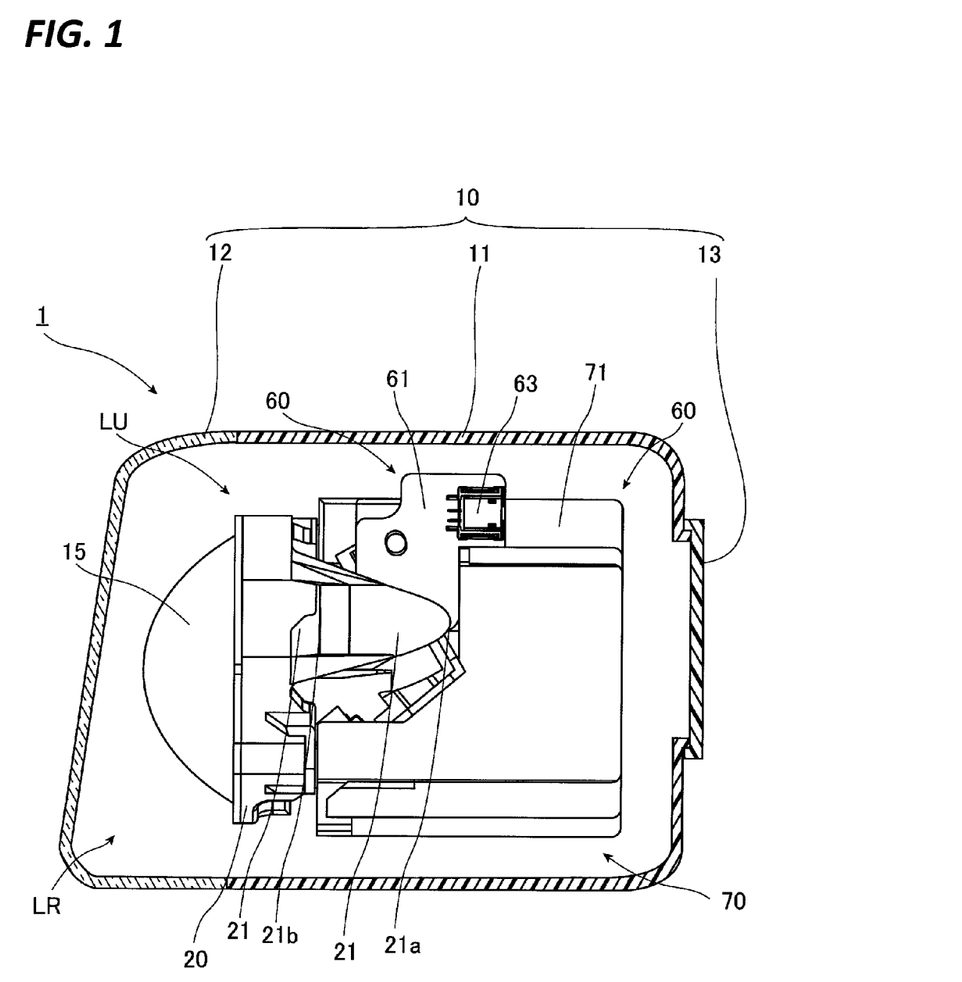
FIG. 1 is a view illustrating a lamp unit according to an exemplary embodiment of the present disclosure and a case for accommodating the lamp unit.

FIG. 1 is a view illustrating a lamp unit according to the exemplary embodiment and a case for accommodating the lamp unit. FIG. 1 illustrates a side view of the lamp unit and a cross-sectional view of the case.

As illustrated in FIG. 1, a vehicular headlamp 1 of the exemplary embodiment includes a case 10 and a lamp unit LU accommodated in the case 10.

The case 10 includes a lamp housing 11, a front cover 12, and a back cover 13 as main components. The front of the lamp housing 11 is open, and a light-transmitting front cover 12 is fixed to the lamp housing 11 so as to close the opening. In addition, an opening smaller than the front is formed at the rear of the lamp housing 11, and the back cover 13 is fixed to the lamp housing 11 so as to close the opening.

A space defined by the lamp housing 11, the front cover 12 closing the opening in the front of the lamp housing 11, and the back cover 13 closing the opening in the rear of the lamp housing 11 serves as a lamp chamber LR, and the lamp unit LU is accommodated in the lamp chamber LR.

Figure 2:
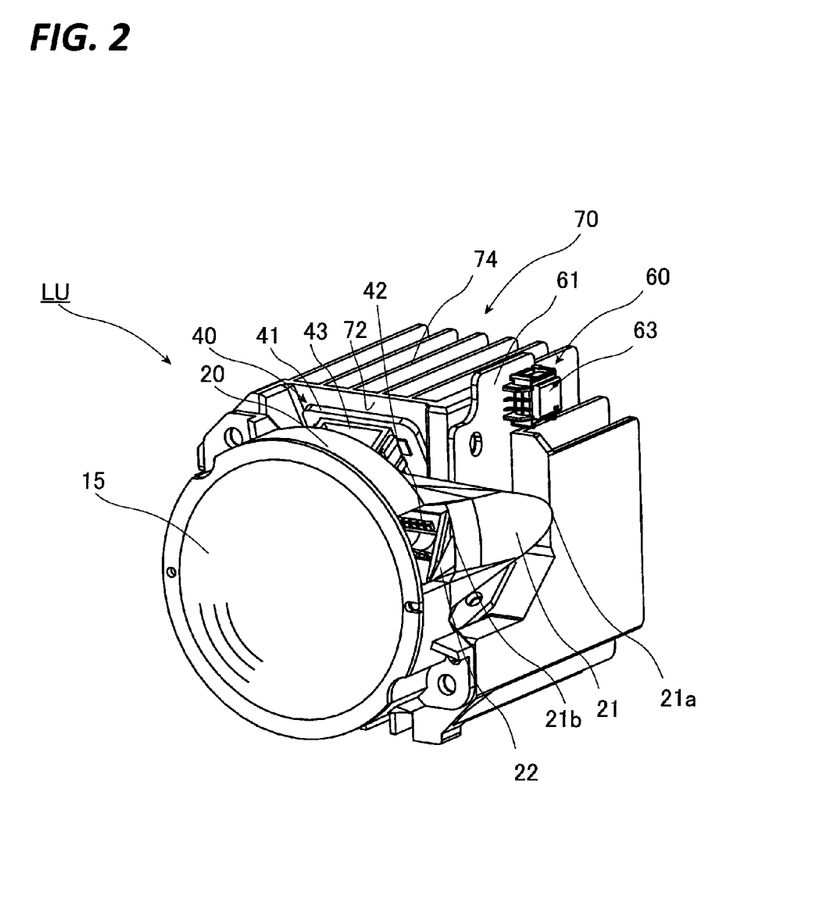
FIG. 2 is a perspective view of the lamp unit illustrated in FIG. 1.
Figure 3:
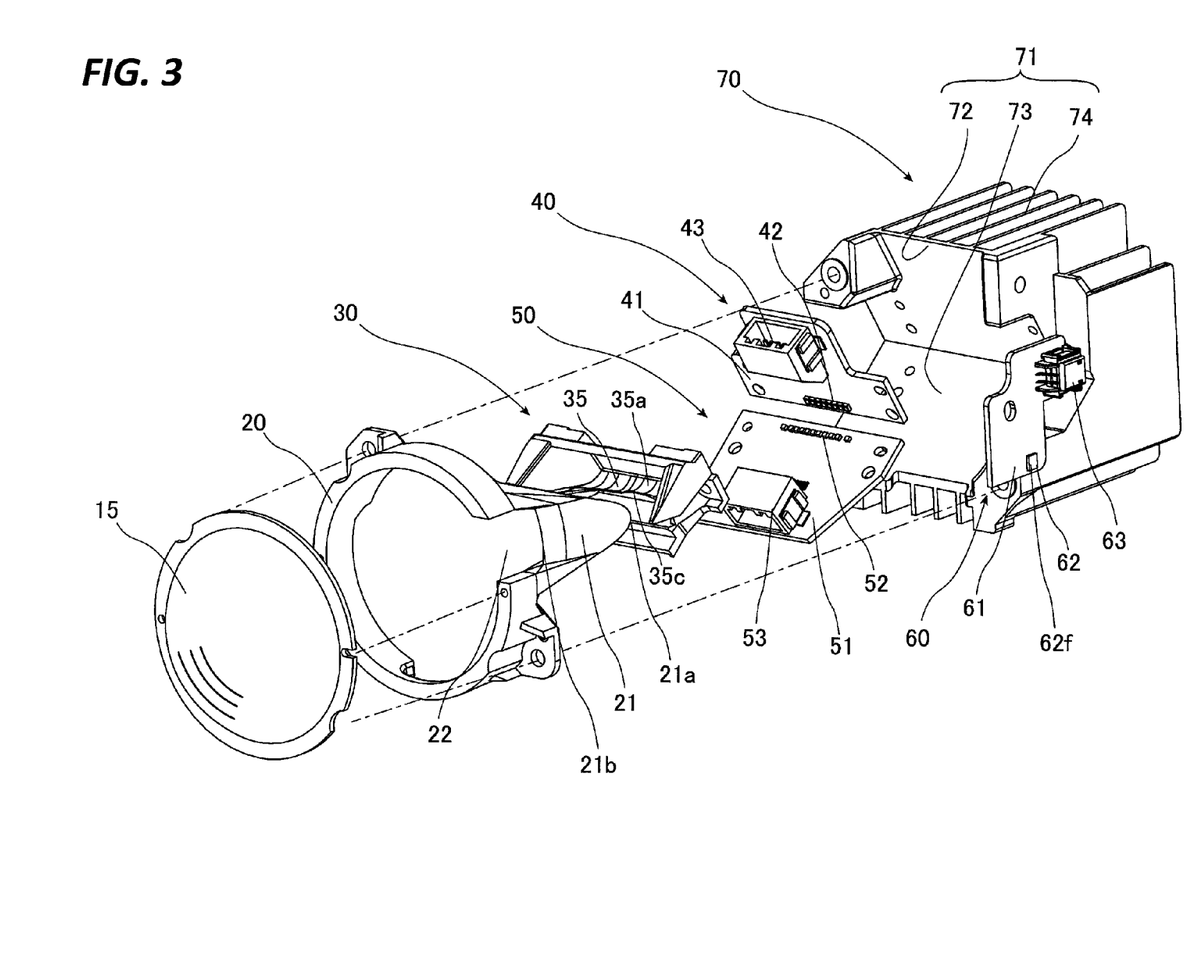
FIG. 3 is an exploded perspective view of the lamp unit illustrated in FIG. 2.

FIG. 2 is a perspective view of the lamp unit illustrated in FIG. 1. FIG. 3 is an exploded perspective view of the lamp unit LU illustrated in FIG. 2.

As illustrated in FIGS. 2 and 3, the lamp unit LU includes a projection lens 15, a lens holder 20, a reflector unit 30, a first light source unit 40, a second light source unit 50, a third light source unit 60, and a cooling unit 70 as main components.

The cooling unit 70 includes a heat sink 71 and a cooling fan 75 as main components. The heat sink 71 includes a first base portion 72, a second base portion 73, and a heat radiating fin 74. The first base portion 72 is a plate-shaped body extending forwardly obliquely upward and leftward and rightward. The second base portion 73 is a plate-like body extending forwardly obliquely downward and leftward and rightward from the lower end of the first base portion 72. The heat radiating fin 74 is formed on the back surfaces of the first base portion 72 and the second base portion 73. The cooling fan 75 is provided on the rear side of the heat radiating fin 74.

The first light source unit 40 includes a first substrate 41, a first light source 42, and a first connector 43 as main components. The first substrate 41 is a plate-like body, and is made of, for example, metal. The first light source 42 is disposed on the first substrate 41 and emits a first light serving as a low beam. The first light source 42 is constituted by a plurality of light sources arranged in parallel. The first light source 42 of the exemplary embodiment is an LED array constituted by a plurality of LEDs arranged in parallel. The light distribution of the first light emitted from the first light source 42 may be controlled by controlling the lighting pattern of each LED included in the LED array. The control of the lighting pattern of the first light source 42 is performed by inputting an electric signal to a light emitting control circuit (not illustrated) via the first connector 43 provided on the first substrate 41.

Since the first substrate 41 is superposed and fixed onto the front surface of the first base portion 72 of the cooling unit 70, the surface of the first substrate 41 is substantially parallel with the front surface of the first base portion 72. Since the first base portion 72 extends forwardly obliquely upward as described above, the surface of the first substrate 41 also extends forwardly obliquely upward. Further, the emission surface of the first light source 42 fixed to the first substrate 41 is substantially parallel with the surface of the first substrate 41. Thus, a normal line to the emission surface of the first light source 42 is directed forwardly obliquely downward.

The second light source unit 50 includes a second substrate 51, a second light source 52, and a second connector 53 as main components. The second substrate 51 is a plate-like body, and is made of, for example, metal. The second light source 52 is disposed on the second substrate 51 and emits a second light serving as a high beam. The second light source 52 is constituted by a plurality of light sources arranged in parallel. The second light source 52 of the exemplary embodiment is an LED array constituted by a plurality of LEDs arranged in parallel. It is possible to control the light distribution of the second light emitted from the second light source 52 by controlling the lighting pattern of each LED included in the LED array. The control of the lighting pattern of the second light source 52 is performed by inputting an electric signal to a light emitting control circuit (not illustrated) via the second connector 53 provided on the second substrate 51.

Since the second substrate 51 is superposed and fixed onto the front surface of the second base portion 73 of the cooling unit 70, the surface of the second substrate 51 is substantially parallel with the front surface of the second base portion 73. Since the second base portion 73 extends forwardly obliquely downward as described above, the surface of the second substrate 51 also extends forwardly obliquely downward. Further, the emission surface of the second light source 52 fixed to the second substrate 51 is substantially parallel with the surface of the second substrate 51. Thus, a normal line to the emission surface of the second light source 52 is directed forwardly obliquely downward.

Since the first light source 42 is fixed to the first base portion 72 and the second light source 52 is fixed to the second base portion 73 as described above, the second light source 52 is disposed below the first light source 42. In the vertical section, the first light source 42 and the second light source 52 are arranged at positions mutually asymmetrical with respect to the optical axis of the projection lens 15. Further, since the normal line to the emission surface of the first light source 42 is directed forwardly obliquely downward and the normal line to the emission surface of the second light source 52 is directed forwardly obliquely downward as described above, the direction in which the first light is emitted from the first light source 42 and the direction in which the second light is emitted from the second light source 52 intersect with each other.

The third light source unit 60 includes a third substrate 61, a third light source 62, and a third connector 63 as main components. The third substrate 61 is a plate-like body, and is made of, for example, metal. The third light source 62 is disposed on the third substrate 61 and emits a third light in response to at least one of an operation of a steering of the vehicle and an operation of a direction indicator. For example, the light amount of the third light is adjusted in accordance with the steering angle of the steering. The third light source 62 of the exemplary embodiment is an LED. Further, the third substrate 61 is fixed to the lateral side of the heat sink 71, and the third light is emitted transversely from the third light source 62. Specifically, the optical axis of the projection lens 15 and a normal line to an emission surface 62f of the third light source 62 are orthogonal to each other when viewed from above, and the normal line to the emission surface 62f of the third light source 62 does not pass through the projection lens 15. Further, the third connector 63 is provided on the third substrate 61, and the light emission of the third light source 62 is controlled by an electrical signal input to the light emitting control circuit (not illustrated) via the third connector 63.

Figure 4:
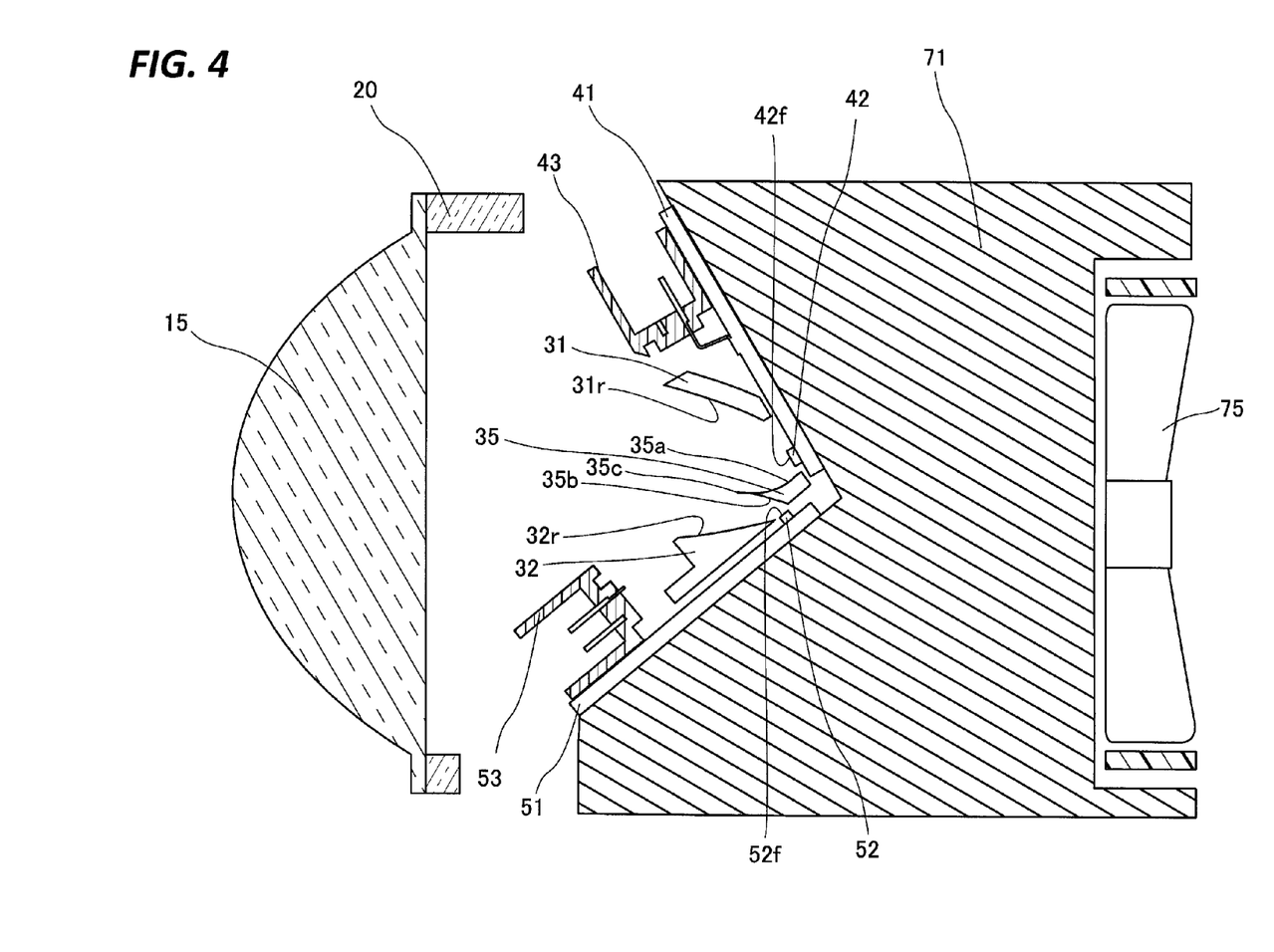
FIG. 4 is a vertical sectional view of the lamp unit illustrated in FIG. 2.
Figure 5:
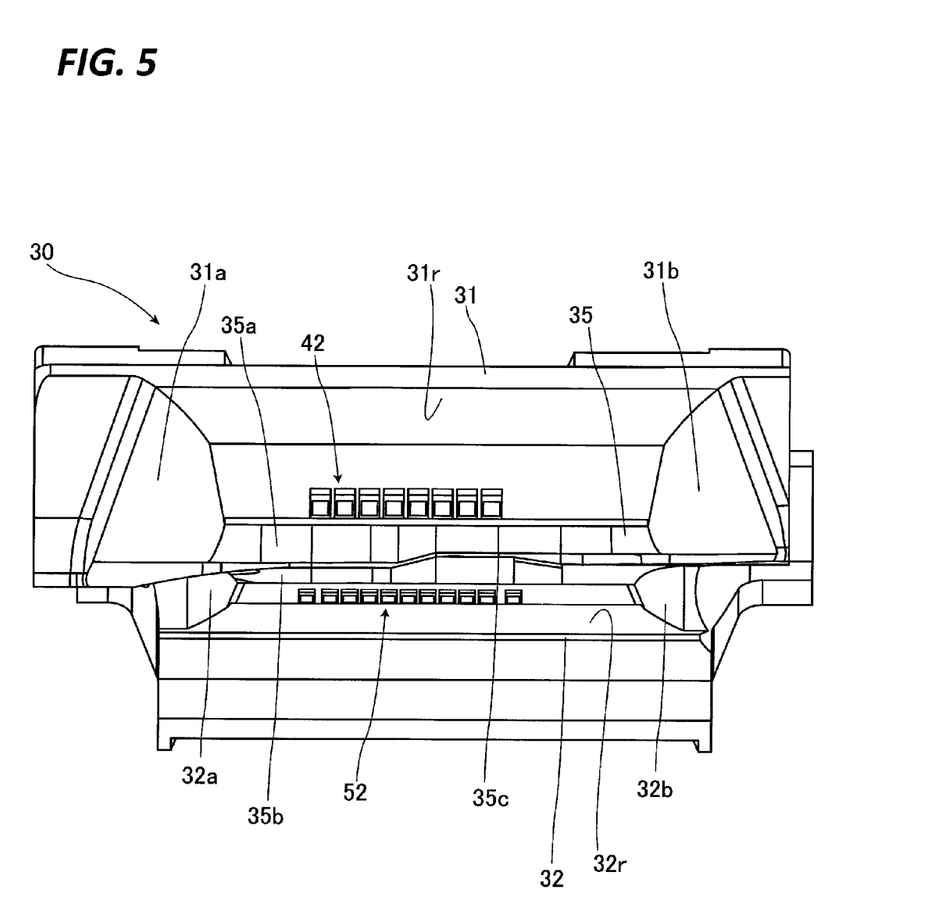
FIG. 5 is a front view of a reflector unit, a first light source, and a second light source illustrated in FIG. 3.

FIG. 4 is a vertical sectional view of the lamp unit LU illustrated in FIG. 2. FIG. 5 is a front view of the reflector unit 30, the first light source 42, and the second light source 52 illustrated in FIG. 3.

The reflector unit 30 includes a shade 35, a reflector 31 for the first light source 42, a first side reflector 31a for the first light source 42, a second side reflector 31b for the first light source 42, a reflector 32 for the second light source 52, a first side reflector 32a for the second light source 52, and a second side reflector 32b for the second light source 52 as main components.

The shade 35 is disposed between the first light source 42 and the second light source 52 and shields a part of the first light. In addition, the shade 35 has a first reflective surface 35a on the upper surface and a second reflective surface 35b on the lower surface. The first reflective surface 35a is a concave reflective surface that extends from the first light source 42 side toward the projection lens 15 and reflects a part of the first light to the front side. The second reflective surface 35b is a concave reflective surface that extends from the second light source 52 side toward the projection lens 15 and reflects a part of the second light to the front side. Further, a front end 35c of the shade 35 has a shape conforming to a cut line (to be described later), and is gradually recessed rearward from the right and left ends toward the center.

The reflector 31 is disposed above the first light source 42 and has a third reflective surface 31r on the first light source 42 side to cover the upper side of the first light source 42. The third reflective surface 31r and the first reflective surface 35a of the shade 35 are formed along the parallel direction of the plurality of LEDs provided in the first light source 42, and constitute a pair of reflectors arranged so as to sandwich the plurality of LEDs therebetween from the upper and lower sides.

The first side reflector 31a is formed at one end in the parallel direction of the plurality of LEDs provided in the first light source 42 in a space sandwiched between the first reflective surface 35a of the shade 35 and the third reflective surface 31r of the reflector 31. Further, the second side reflector 31b is formed at the other end of the space. The first side reflector 31a and the second side reflector 31b are formed such that the interval therebetween increases from the rear side toward the front side.

The reflector 32 is disposed below the second light source 52 and has a fourth reflective surface 32r on the second light source 52 side to cover the lower side of the second light source 52. The fourth reflective surface 32r and the second reflective surface 35b of the shade 35 are formed along the parallel direction of the plurality of LEDs provided in the first light source 52, and constitute a pair of reflectors arranged so as to sandwich the plurality of LEDs therebetween from the upper and lower sides.

The first side reflector 32a is formed at one end in the parallel direction of the plurality of LEDs provided in the second light source 52 in a space sandwiched between the second reflective surface 35b of the shade 35 and the fourth reflective surface 32r of the reflector 32. Further, the second side reflector 32b is formed at the other end of the space. The first side reflector 32a and the second side reflector 32b are formed such that the interval therebetween increases from the rear side toward the front side.

The projection lens 15 is a plano-convex lens and is disposed at a position in front of the first light source 42 and the second light source 52 where a normal line to an emission surface 42f of the first light source 42 and a normal line to an emission surface 52f of the second light source 52 pass. The first light and the second light are incident from the flat incident surface on the rear side of the projection lens 15 and are transmitted through the projection lens. Further, in the exemplary embodiment, the focus of the projection lens 15 is formed between the front end 35c of the shade 35 and the projection lens 15.

The lens holder 20 illustrated in FIGS. 1 to 4 is disposed between the cooling unit 70 and the projection lens 15. The projection lens 15 is fixed to the lens holder 20, and the lens holder 20 is fixed to the cooling unit 70, so that the relative positions of the projection lens 15, the lens holder 20, and the cooling unit 70 are fixed. In addition, since the reflector unit 30, the first light source unit 40, the second light source unit 50, and the third light source unit 60 are fixed to the cooling unit 70, the relative positions of the reflector unit 30, the first light source unit 40, the second light source 50, and the third light source unit 60, and the projection lens 15 and the lens holder 20 are also fixed.

An optical member 21 is integrally formed on the lateral side of the lens holder 20 where the third light source 62 is disposed, to adjust the light distribution of the third light emitted from the third light source 62. The optical member 21 of the exemplary embodiment is a convex lens whose width in a direction perpendicular to a direction in which the third light is incident increases as being close to the front side from the rear side. That is, the vertical width of the optical member 21 increases as being close to a front end 21b of the optical member 21 from a rear end 21a thereof. Further, the lens holder 20 of the exemplary embodiment has a notch 22 as a through-hole formed between the optical member 21 and the projection lens 15.

Figure 6:
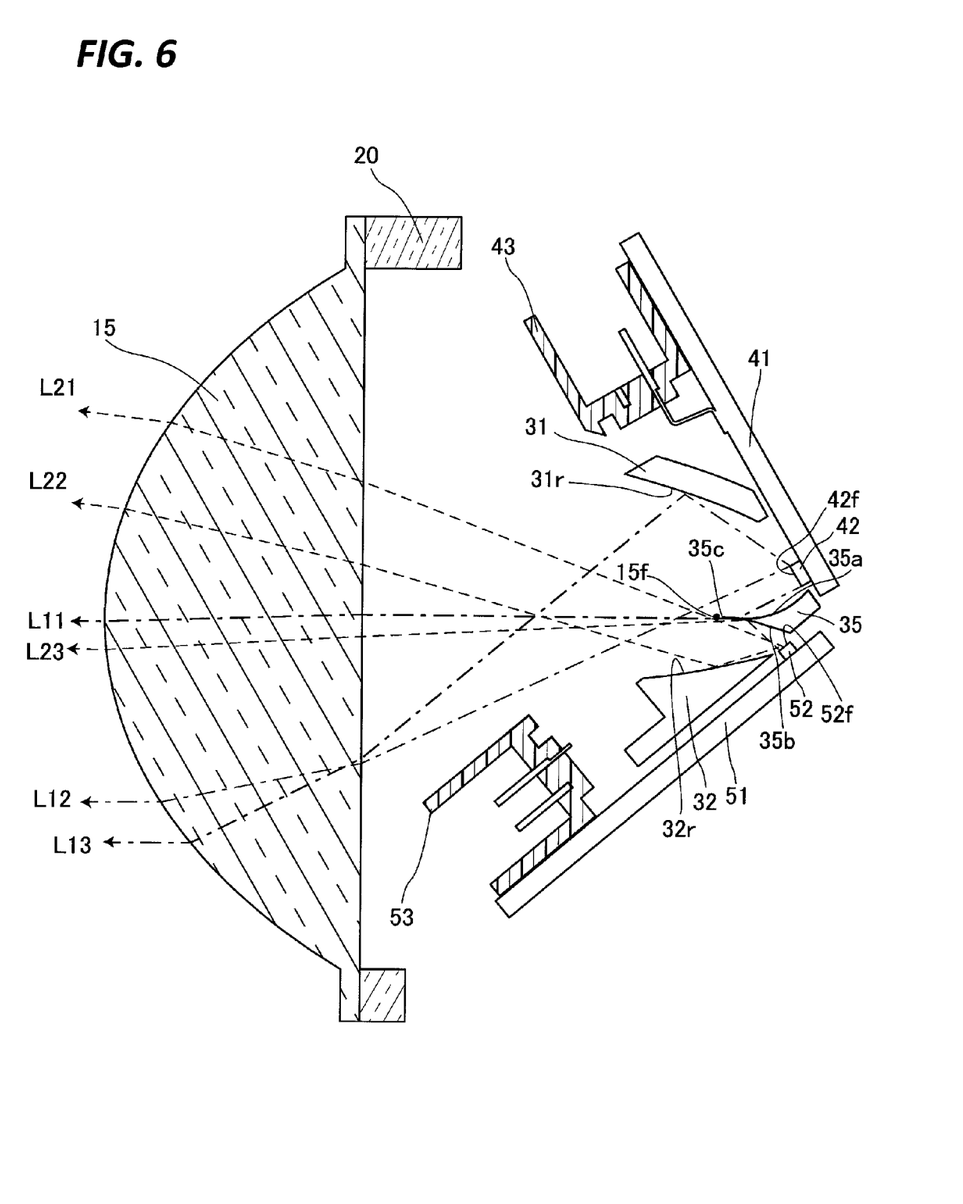
FIG. 6 is a view schematically illustrating an exemplary optical path of the light emitted from the first and second light sources by enlarging a part of FIG. 4.

Next, descriptions will be made on the light emission from the vehicular headlamp 1 of the exemplary embodiment and the operation of the vehicular headlamp 1. FIG. 6 is a view schematically illustrating an exemplary optical path of the light emitted from the first light source 42 and the second light source 52 by enlarging a part of FIG. 4. The angles of the respective reflection surfaces and the reflection angle or refraction angle of the light illustrated in FIG. 6 may not be accurate. In addition, as described above, the vehicular headlamps may be provided symmetrically in the left and right sides of the vehicle. In the following, descriptions will be made on the light distribution when the vehicular headlamps provided on the left and right sides are turned on or off in the same manner.

Figure 7A:
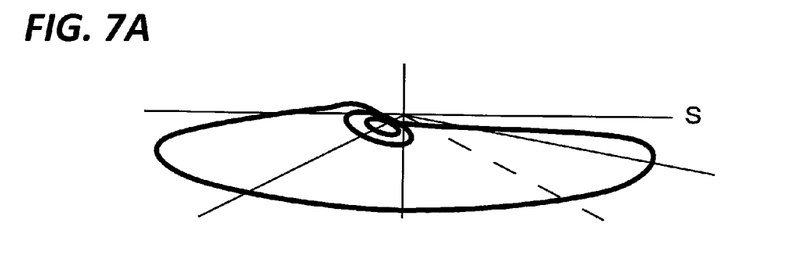
FIG. 7A is a view illustrating a light distribution of a low beam.

First lights L11, L12, and L13 emitted from the first light source 42 are incident on the projection lens 15, transmitted therethrough, and emitted through the front cover 12, as described below, thereby forming a low-beam light distribution illustrated in FIG. 7A.

The first lights L11, L12, and L13 are emitted from the emission surfaces 42f of the respective LEDs provided in the first light source 42. In the LEDs, the intensities of the first lights L11 and L12 emitted in the direction perpendicular to the emission surfaces 42f are relatively strong as compared with the intensity of the first light L13 emitted in the other direction. Since the normal line to the emission surface 42f of each LED provided in the first light source 42 is directed forwardly obliquely downward, the first lights L11 and L12 emitted vertically from the emission surface 42f of the first light source 42 are emitted toward the front end 35c of the shade 35 and pass through the vicinity of the front end 35c of the shade 35 or the front side of the front end 35c of the shade 35. Therefore, all or a part of the first lights L11 and L12 vertically emitted from the emission surface 42f of the first light source 42 is irradiated to the vicinity of the front end 35c of the shade 35, so that the amount of the first lights L11 and L12 incident on the front end 35c of the shade 35 increases. In addition, a part of the light irradiated to the rear side of the front end 35c of the first light 35 is shielded by the shade 35. Since the shade 35 shields a part of the first light, the front end 35c of the shade 35 may form a cut line of the low-beam light distribution by the first light. In the exemplary embodiment, as described above, a part of the first light is directly incident on the front end 35c of the shade 35 where the cut line is formed, and the amount of the first light incident on the front end 35c is increased, so that the vicinity of the front end 35c of the shade 35 is likely to be bright. Here, a focus 15f of the projection lens 15 is formed between the front end 35c of the shade 35 and the projection lens 15, that is, in the vicinity of the front end 35c of the shade 35, so that the vicinity of the cut line of the low-beam light distribution may be brightened. The front end 35c of the shade 35 has a shape conforming to a desired cut line shape of the low beam. In the exemplary embodiment, the front end 35c of the shade 35 is formed in a concave shape as described above.

At least a part of the first light L12 passing through the front side of the front end 35c of the shade 35 is incident directly on the projection lens 15. In addition, the other part of the first light is reflected forward by one of the first reflective surface 35a, the third reflective surface 31r, the first side reflector 31a, and the second side reflector 31b and incident on the projection lens 15.

The first light L11 reflected by the first reflective surface 35a is reflected forward with a small divergence angle and is then incident on the projection lens 15. As a result, it is possible to make a predetermined range of the light distribution of the first light relatively brighter than other ranges. For example, it is possible to further brighten the vicinity of the cut line of the low-beam light distribution by collecting the first light L11 reflected by the first reflective surface 35a on the vicinity of the front end 35c of the shade 35.

Further, in the exemplary embodiment, since the first reflective surface 35a and the third reflective surface 31r are provided so as to sandwich the plurality of LEDs provided in the first light source 42 therebetween from the upper and lower sides, it is easy to effectively utilize the first light emitted from the plurality of LEDs. Most of the first light is incident on the projection lens 15 directly or through the reflection on the first reflective surface 35a as described above. As described above, since the third reflective surface 31r does not reflect all of the first light, it is possible to suppress the enlargement.

The first light L11 reflected by the first reflective surface 35a may be collected in the vicinity of the front end 35c of the shade 35 as described above. Meanwhile, the first light L13 reflected by the third reflective surface 31r may be irradiated in a wider range to form the first light distribution. Therefore, the first light L13 reflected by the third reflective surface 31r may be divergent.

Further, the first side reflector 31a and the second side reflector 31b may disperse the light from the LEDs disposed at both ends of the plurality of LEDs provided in the first light source 42, which is then emitted in a wide range. Therefore, even if the number of LEDs provided in the first light source 42 is reduced, it is possible to form a wide light distribution.

Figure 7B:
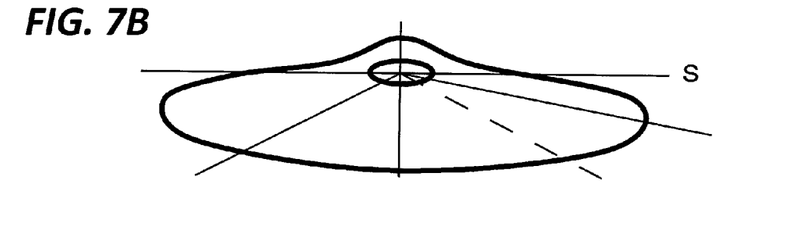
FIG. 7B is a view illustrating a light distribution of a high beam.

Second lights L21, L22, and L23 emitted from the second light source 52 are incident on the projection lens 15, transmitted therethrough, and emitted through the front cover 12, as described below. At this time, at least a part of the second lights L21, L22, and L23 are emitted upward from the first lights L11, L12, and L13. Accordingly, a light distribution above the cut line is formed by at least a part of the second lights L21, L22, and L23. In addition, the light distribution by the second light emitted from the second light source 52 and the light distribution by the first light emitted from the first light source 42 are combined with each other to form a high-beam light distribution illustrated in FIG. 7B.

The second lights L21, L22, and L23 are emitted from the emission surfaces 52f of the respective LEDs provided in the second light source 52. Since the normal line to the emission surface 52f of each LED provided in the second light source 52 is directed forwardly obliquely upward, the second light L23 emitted vertically from the emission surface 52f of the second light source 52 is emitted toward the front end 35c of the shade 35, so that the vicinity of the front end 35c of the shade 35 is likely to be bright. Here, since the focus of the projection lens 15 is formed in the vicinity of the front end 35c of the shade 35, it is possible to make the vicinity of the cut line, that is, the overlapping portion of the light distribution of the first light and the light distribution of the second light relatively brighter than the other portions.

At least a part of the second light L21 passing through the front side of the front end 35c of the shade 35 is incident directly on the projection lens 15. In addition, the other part of the first light is reflected forward by one of the second reflective surface 35b, the fourth reflective surface 32r, the first side reflector 32a, and the second side reflector 32b and is incident on the projection lens 15.

The second light L23 reflected by the second reflective surface 35b is reflected forward with a small divergence angle and is then incident on the projection lens 15. As a result, it is possible to make a predetermined range of the light distribution of the second light relatively brighter than other ranges. For example, it is possible to further brighten the overlapping portion of the light distribution of the first light and the light distribution of the second light by collecting the second light L23 reflected on the second reflective surface 35b on the vicinity of the front end 35c of the shade 35.

Further, in the exemplary embodiment, since the second reflective surface 35b and the fourth reflective surface 32r are provided so as to sandwich the plurality of LEDs provided in the second light source 52 therebetween from the upper and lower sides, it is easy to effectively utilize the second light emitted from the plurality of LEDs. Most of the second light is incident on the projection lens 15 directly or through the reflection on the second reflective surface 35b as described above. As described above, since the fourth reflective surface 31r does not reflect all of the second light, it is possible to suppress the enlargement.

The second light L23 reflected by the second reflective surface 35b may be collected in the vicinity of the front end 35c of the shade 35 as described above. Meanwhile, the second light L22 reflected by the fourth reflective surface 32r may be irradiated in a wider range to form the second light distribution. Therefore, the second light L22 reflected by the fourth reflective surface 32r may be divergent.

Further, the first side reflector 32a and the second side reflector 32b may disperse the light from the LEDs disposed at both ends of the plurality of LEDs provided in the second light source 52, which is then emitted in a wide range. Therefore, even if the number of LEDs provided in the second light source 52 is reduced, it is possible to form a wide light distribution.

Figure 7C:
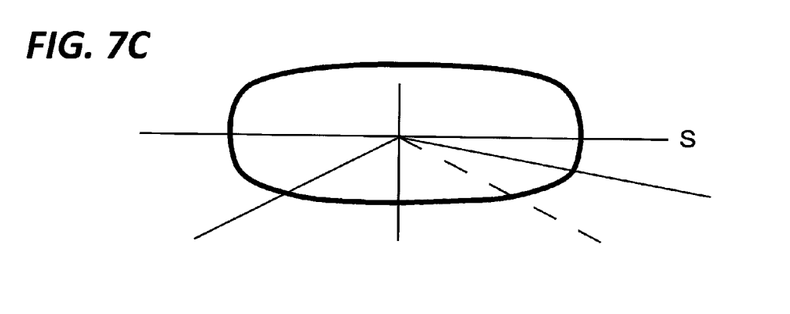
FIG. 7C is a view illustrating a light distribution of daytime illumination.

In the daylight illumination, a part of the plurality of LEDs provided in the first light source 42 and the second light source 52 are weakly turned on to form a light distribution for daytime illumination illustrated in FIG. 7C.

The third light is emitted transversely from the third light source 62 as described above. The third light emitted from the third light source 62 is emitted with the light distribution adjusted by the optical member 21. Since the third light is emitted in this manner, it is easy to use the third light source 62 as a light source for lateral irradiation of the vehicle. In addition, since the optical member 21 is a lens whose width in a direction perpendicular to the direction in which the third light is incident increases as being close to the front side from the rear side, it is easy to emit the third light in the forwardly obliquely transverse direction. Further, since the optical member 21 is a convex lens, it is easy to irradiate the light within a predetermined range by reducing the divergence angle of the third light. Further, since the notch 22 is formed between the optical member 21 and the projection lens 15, it is possible to suppress the third light from being propagated from the optical member 21 to the projection lens 15 and causing an unintended light to be emitted from the projection lens 15. In this manner, the light distribution of the third light is adjusted by the optical member 21, separately from those of the first light and the second light.

The third light emitted from the third light source 62 is adjusted in response to at least one of the operation of the steering of the vehicle and the operation of the direction indicator as described above, and is temporarily irradiated toward the outside of the vehicle in a front view rather than a range in which the first light or the second light is irradiated.

As described above, the heat generated when the first light source 42, the second light source 52, and the third light source 62 emit light is transmitted to the heat sink 71, and is cooled by the cooling fan 75. As described above, the first light source 42, the second light source 52, and the third light source 62 share a single heat sink 71 in the vehicular headlamp 1 of the exemplary embodiment. Therefore, it is not necessary to provide a heat sink or a cooling fan for the third light source separately from the heat sink or the cooling fan for the first light source 42 and second light source 52. As a result, the vehicular headlamp 1 may be suppressed from being enlarged while providing the third light source 62 in addition to the first light source 42 serving as a low-beam light source and the second light source 52 serving as a high-beam light source. Further, since the optical member 21 for adjusting the light distribution of the third light and the projection lens 15 are formed integrally in this manner, the vehicular headlamp 1 may be further suppressed from being enlarged.

Further, as described above, in the vehicular headlamp 1, since the normal line to the emission surface 42f of the first light source 42 is directed forwardly obliquely downward, a part of the first light may be incident directly on the projection lens 15, and the other part of the first light may be incident on the projection lens 15 by being reflected by the first reflective surface 35a disposed below the first light source 42. Therefore, the first light may be used effectively. Further, in the vehicular headlamp 1, since the normal line to the emission surface 52f of the second light source 52 is directed forwardly obliquely upward, a part of the second light may be incident directly on the projection lens 15, and the other part of the second light may be incident on the projection lens 15 by being reflected by the second reflective surface 35b disposed above the second light source 52. Therefore, the second light may be used effectively. Further, since the first reflective surface 35a and the second reflective surface 35b are formed on one surface and the other surface of the shade 35, the first reflective surface 35a and the second reflective surface 35b may be formed in one member. In addition, since it is presupposed that a part of the first light and a part of the second light are incident directly on the projection lens 15, it is not necessary to make the first reflective surface 35a and the second reflective surface 35b greatly project forward. Thus, in the vehicular headlamp 1, the first light and the second light may be efficiently incident on the projection lens 15 without using a large reflector. Therefore, the vehicular headlamp 1 may include a plurality of light sources that emit light in mutually different directions, and may be suppressed from being enlarged while effectively utilizing the light from the light sources.

The present disclosure has been described using the above-described exemplary embodiment, but the present disclosure is not limited thereto.

For example, the emission direction of the third light is not particularly limited. For example, the third light may serve as an overhead sign lamp by being emitted forwardly obliquely upward from the vehicular headlamp. In addition, the third light may be a part of the low-beam light distribution or a light that illuminates the running line, by being emitted obliquely forward downward from the vehicular headlamp. Further, the third light may be a light distribution as a clearance lamp (CLL) or an auxiliary light distribution as a daytime running lamp (DRL).

Further, the arrangement of the third light source 62 is not particularly limited. For example, the third light source 62 may be disposed above the first light source 42 or may be disposed below the second light source 52. Further, the third light source 62 may be provided on the first substrate 41. In this case, the third light source 62 may be provided away from the first light source 42, or may be provided so as to emit light in a direction different from that of the first light source 42 by bending the first substrate 41.

Further, the optical member 21 for adjusting the light distribution of the third light may be provided separately from the lens holder 20. Further, the optical member 21 is not limited to the lens but may be, for example, a reflective member that reflects the third light in a desired direction. The shape of the optical member 21 may be changed appropriately depending on the emission direction of the third light.

Further, in the above-described exemplary embodiment, descriptions have been made on the example in which a through-hole is formed between the lens holder 20 and the projection lens 15 by the notch 22 formed in the lens holder 20. However, from the viewpoint of suppressing a part of the third light from being propagated to the projection lens 15, a through-hole may be formed in front of the optical member 21 of the lens holder 20, or a light shielding member may be provided between the optical member 21 and the projection lens 15. However, the present disclosure is not limited to the configuration in which the third light is suppressed from being propagated to the projection lens 15, but a part of the third light may be incident on the projection lens 15.

In addition, it may be conceivable that at least one of the first light source 42, the second light source 52, and the third light source 62 is disposed on another heat sink. For example, the third light source 62 and one of the first light source 42 and the second light source 52 may share one heat sink, and the other of the first light source 42 and the second light source 52 may be disposed on another heat sink.

As described above, according to the present disclosure, there is provided a vehicular headlamp which includes a third light source in addition to low-beam and high-beam light sources and is suppressed from being enlarged. The vehicular headlamp may be used in the field of headlamps for vehicles such as, for example, automobiles.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular headlamp comprising:
a first light source in which a normal line to an emission surface of the first light source is directed forwardly and obliquely downward such that a first light serving as a low beam is emitted from the first light source;
a second light source in which a normal line to an emission surface of the second light source is directed forwardly and obliquely upward such that a second light serving as a high beam is emitted from the second light source;
a projection lens that transmits the first light and the second light;
a third light source that emits a third light in response to at least one of an operation of a steering and an operation of a direction indicator; and
an optical member that adjusts a light distribution of the third light,
wherein the first light source, the second light source, and the third light source share a single heat sink.

2. The vehicular headlamp of claim 1, wherein an optical axis of the projection lens and a normal line to an emission surface of the third light source are orthogonal to each other when viewed from above such that the third light is emitted transversely from the third light source.

3. The vehicular headlamp of claim 2, wherein the optical member is a lens formed integrally with the projection lens.

4. The vehicular headlamp of claim 3, wherein a through-hole or a notch is formed between the optical member and the projection lens.

5. The vehicular headlamp of claim 4, wherein the optical member is a lens whose width in a direction perpendicular to a direction in which the third light is incident increases as being close to a front side from a rear side.

6. The vehicular headlamp of claim 2, wherein the optical member is a lens whose width in a direction perpendicular to a direction in which the third light is incident increases as being close to a front side from a rear side.

7. The vehicular headlamp of claim 3, wherein the optical member is a lens whose width in a direction perpendicular to a direction in which the third light is incident increases as being close to a front side from a rear side.

8. The vehicular headlamp of claim 1, wherein the optical member is a lens formed integrally with the projection lens.

9. The vehicular headlamp of claim 8, wherein a through-hole or a notch is formed between the optical member and the projection lens.

10. The vehicular headlamp of claim 9, wherein the optical member is a lens whose width in a direction perpendicular to a direction in which the third light is incident increases as being close to a front side from a rear side.

11. The vehicular headlamp of claim 8, wherein the optical member is a lens whose width in a direction perpendicular to a direction in which the third light is incident increases as being close to a front side from a rear side.

12. The vehicular headlamp of claim 1, wherein the optical member is a lens whose width in a direction perpendicular to a direction in which the third light is incident increases as being close to a front side from a rear side.

13. The vehicular headlamp of claim 1, wherein the optical member is a convex lens.

14. The vehicular headlamp of claim 1, wherein a light amount of the third light is adjusted in accordance with a steering angle of the steering.

15. The vehicular headlamp of claim 1, wherein the third light is irradiated toward an outside of a range in which the first light or the second light is irradiated when viewed from a front.

16. The vehicular headlamp of claim 1, wherein the light distribution of the third light is adjusted separately from the first light and the second light.

* * * * *